June 3, 1952 R. B. NAWMAN 2,598,713
APPARATUS FOR HANDLING AND DUMPING STACKED ARTICLES
Filed Jan. 20, 1947 5 Sheets-Sheet 2

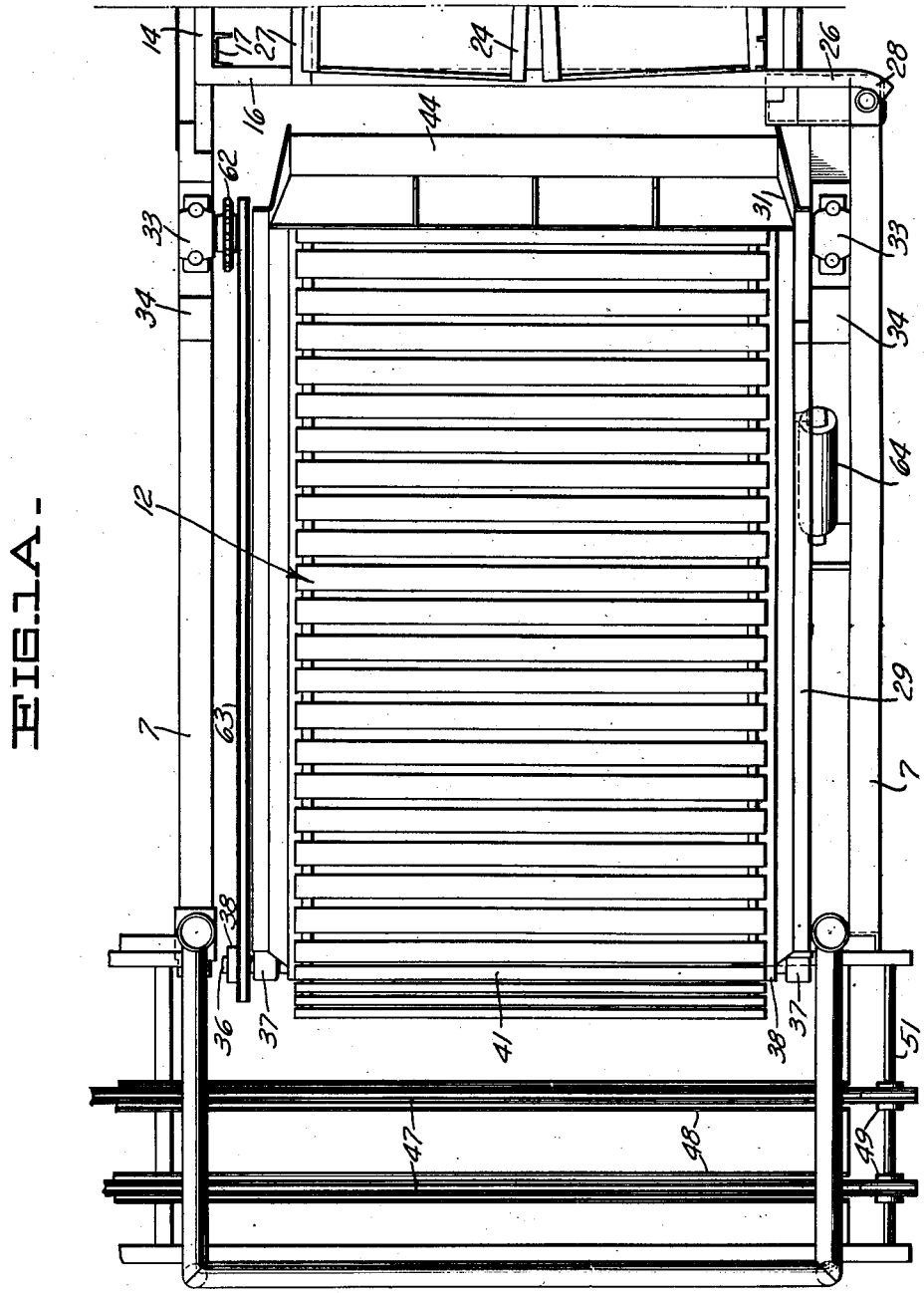

INVENTOR
ROLLIE B. NAWMAN
BY Joseph B. Gardner

June 3, 1952 R. B. NAWMAN 2,598,713
APPARATUS FOR HANDLING AND DUMPING STACKED ARTICLES
Filed Jan. 20, 1947 5 Sheets-Sheet 3
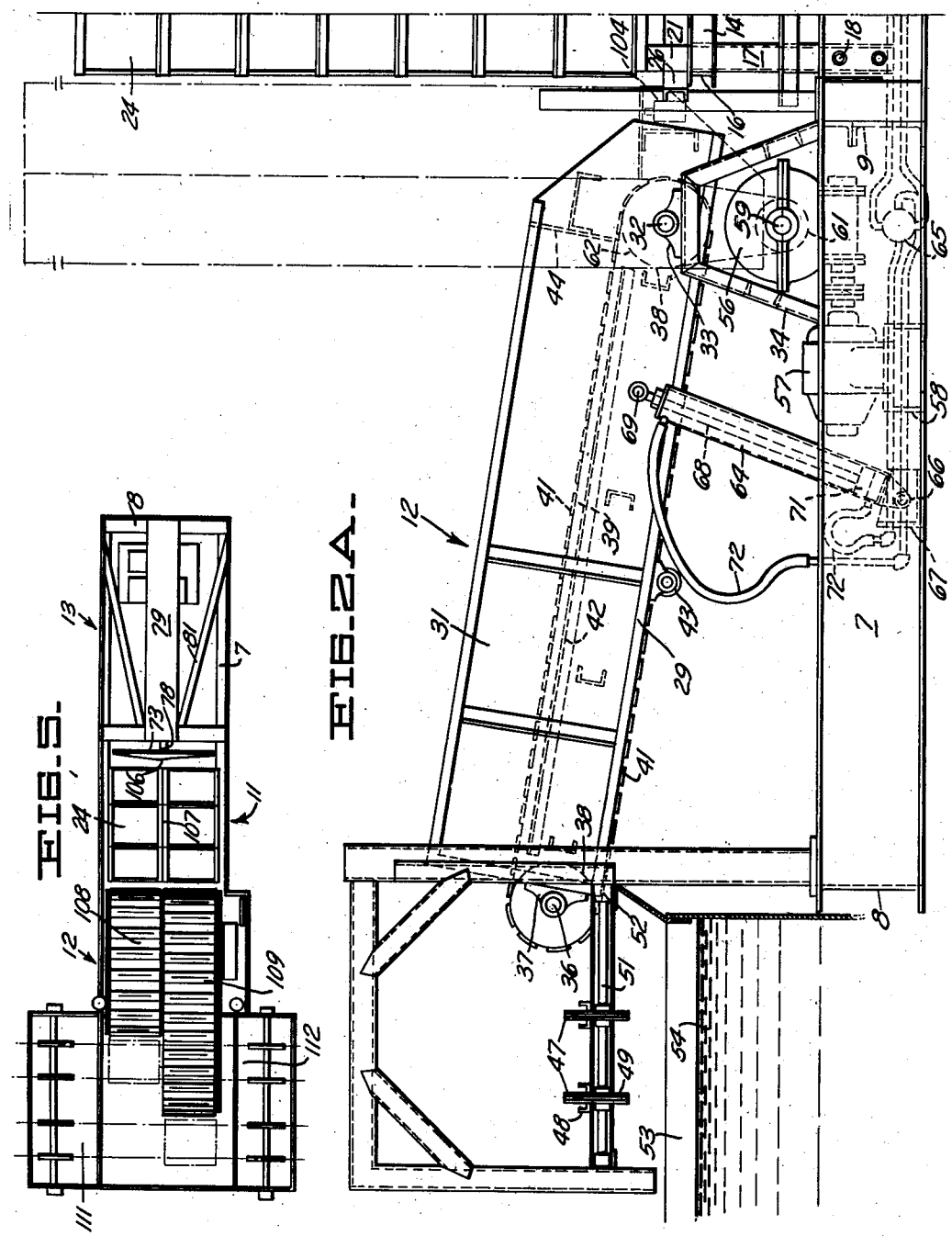
INVENTOR
ROLLIE B. NAWMAN
BY Joseph B. Gardner
his atty.

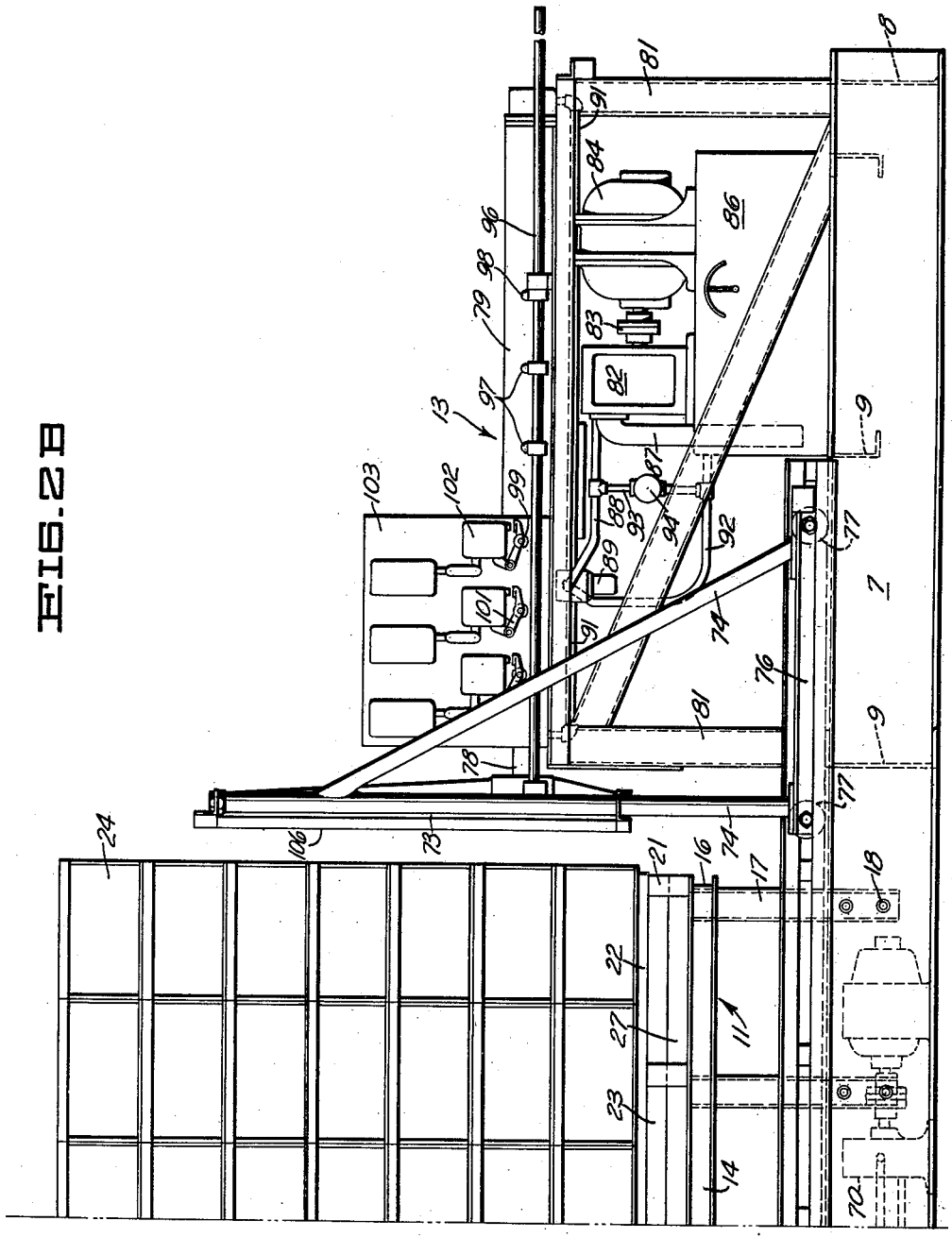

June 3, 1952  R. B. NAWMAN  2,598,713
APPARATUS FOR HANDLING AND DUMPING STACKED ARTICLES
Filed Jan. 20, 1947  5 Sheets-Sheet 5
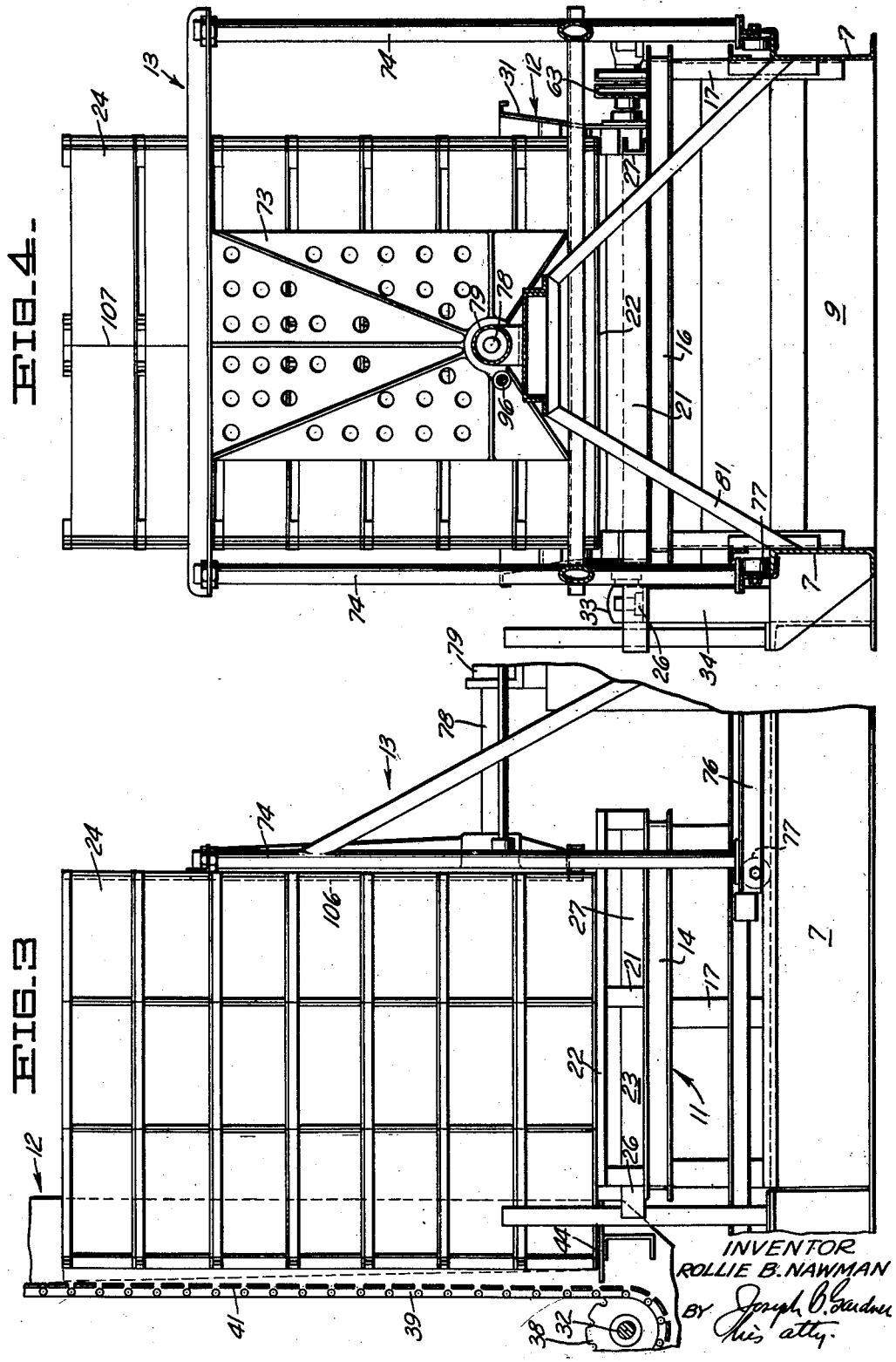
INVENTOR
ROLLIE B. NAWMAN
BY Joseph C. Gardner
his atty.

Patented June 3, 1952

2,598,713

UNITED STATES PATENT OFFICE 2,598,713

APPARATUS FOR HANDLING AND DUMPING STACKED ARTICLES

Rollie B. Nawman, Oakland, Calif., assignor to Benner-Nawman, Inc., Oakland, Calif., a corporation of California Application January 20, 1947, Serial No. 723,008

8 Claims. (Cl. 214—1.1)

This invention relates to mechanism for receiving grouped stacks of lug boxes, or the like receptacles containing fruit or similar loose materials, and for progressively handling the stacks so as to up-end and dump the contents from the individual boxes of the stacks.

An object of the invention is to provide apparatus designed particularly for the handling of stacked articles of the class described arranged on a platform or portable pallet in a group comprising two or more stacks to a side.

Another object of the invention is to provide mechanism of the character described which is capable of dumping large quantities of the stacked receptacles in a given period of time and which requires a comparatively small amount of trucking operations to keep it supplied with stacks to be dumped.

A further object of the invention is to provide apparatus of the type referred to in which all operations of dumping the receptacles and moving the stacks thereof into position to be subsequently dumped are under the control of a single operator.

Still another object of the invention is to provide mechanism of the character described in which the various receptacles from the time that they are deposited in the mechanism until they are dumped, are subjected to gentle handling without shocks or other strains induced by droppage or abrupt changes of movement which might bruise or otherwise damage the contents of the receptacles.

A still further object of the invention is to provide mechanism for the handling and dumping of stacked boxes or the like which comprises an integral unit capable of being set in operative position on a factory floor without requiring the provision of pits or other modifications in the floor surface to accommodate it.

Yet another object of the invention is to provide apparatus of the character described having a load platform capable of arrangement to receive, along a loading path approaching from opposite sides thereof, a pallet containing a plurality of stacks of boxes or the like, from which successive stacks may be moved, in a direction traversing the loading path, onto a conveyor for transporting the boxes to a dumping station and for up-ending the boxes during the transportation so as to discharge the contents thereof, by mechanism operative to move the stacks, all of said operations being interlocked so that none is capable of occurring in improper sequence or timing with respect to the other operations.

It is a further object of the invention to provide, in apparatus of the type referred to, pusher mechanism for moving grouped stacks of boxes or the like between spaced positions, which is constituted and arranged to effect such movement without the imposition of concentrated pressure or wracking strains on the stacks which might tend to rupture or otherwise injure the individual containers thereof and consequently cause possible damage to their contents.

It is still a further object of the invention to provide, in apparatus of the class described, means for providing a primary controlled tilt of a stack of boxes relative to other stacks of a group thereof so as to effect breakage of any overlap which may exist between adjacent boxes of adjoining stacks.

It is yet a further object of the invention to provide, in apparatus of the type referred to, means operative with the mechanism for pushing of boxes from a pallet for relatively separating said stacks during the pushing operation.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

Referring to the drawings:

Figure 1A is a top plan view of the sinistral portion of the apparatus of my invention.

Figure 2A is a side elevational view of the structure shown in Figure 1A.

Figure 2B is a side elevational view of the structure illustrated in Figure 1B.

Figure 3 is a portional side elevational view of the structures of Figures 2A and 2B, showing the operating of shifting the grouped stacks to move the outermost row of stacks from the pallet onto the dumper.

Figure 4 is an end elevational view of the structure shown in Figure 3.

Figure 5 is a top plan view of the apparatus of my invention, to a reduced scale, showing the association therewith of plural box-takeaway conveyors so as to increase the box handling capacity of the apparatus.

Figure 1B:
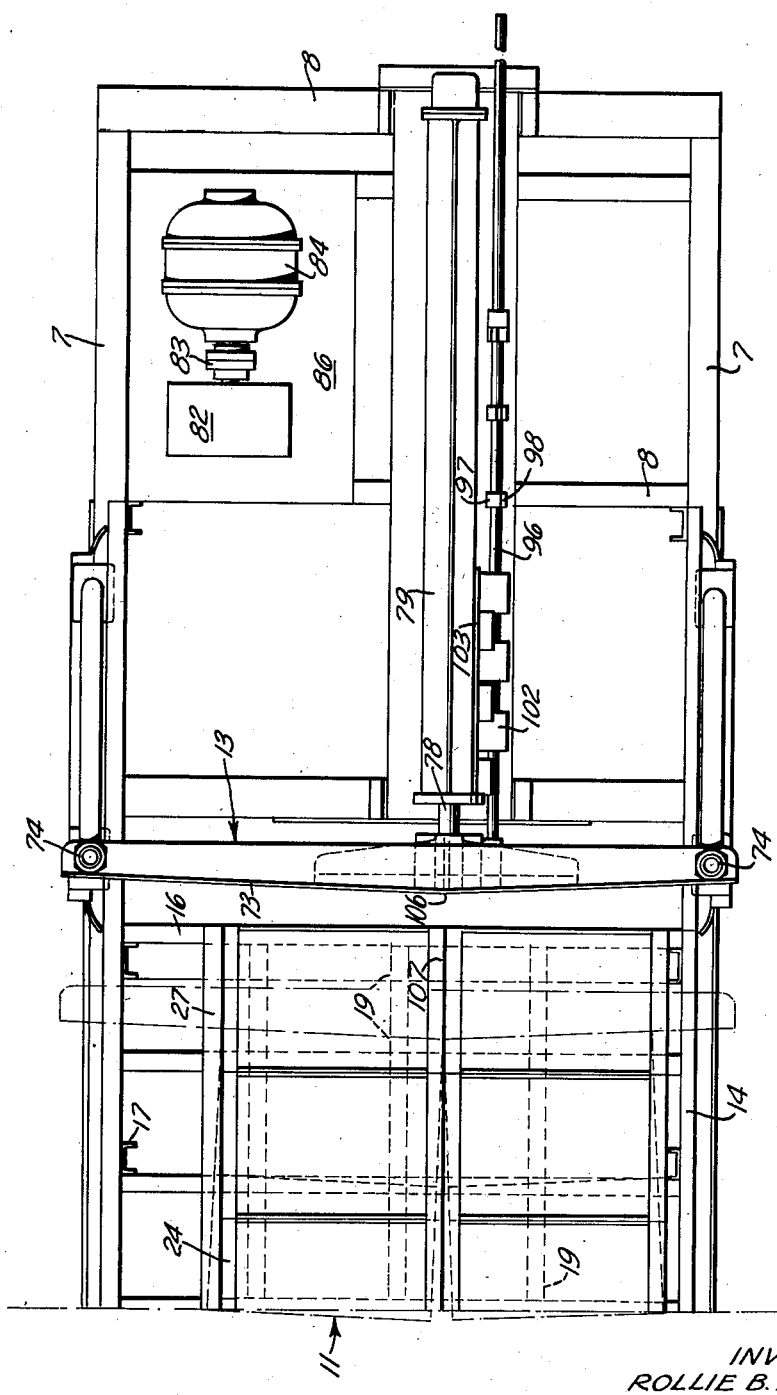
Figure 1B is a top plan view of the dextral portion of the apparatus of my invention forming a continuation of the structure of Figure 1A.

In the form in which I have chosen to illustrate my invention, I provide a base structure preferably comprising two or more relatively spaced and parallel channel beams 7 joined together at spaced intervals by transversely extending end rails 8 and cross-members 9 to form a substantially rectangular unit assembly capable of being lag bolted or otherwise secured to the surface of a floor or other supporting structure. Substantially medially of the length of the base structure I provide a load-receiving platform, indicated generally by the numeral 11, and on opposite sides of the platform I provide, respectively, a dumper and a pallet unloader mechanism. The dumper is indicated, generally, by the numeral 12 and the unloader by the numeral 13.

The load-receiving platform comprises a suitable flat bed preferably constructed of joined structural beams forming side and transverse rails 14 and 16 respectively connected with and supported by suitable vertical leg members 17 secured by bolts 18 to the base structure beams 7. Intercostal beams 19, extending between the transverse rails 14, are provided for lending rigidity to the platform and for supplementing the load-bearing area thereof. The platform is adapted to receive and support a transport pallet of the type extensively used with fork lift tractor vehicles and comprising two or more sill members 21 secured to and forming a base for a floor 22 on which the load may be placed. The openings 23 below the floor 22 and between adjacent sills provide for insertion of the fork lift elements under the floor so that both pallet and load may be lifted and transported together. The load in the present case comprises a group of stacks of lug boxes 24 containing fruit or other such loosely concentrated substance. Locating means for accurately positioning successive pallets and their loads relative to the load-receiving platform are provided in angularly intersecting side and rear curb rails 26 and 27 detachably secured to the platform structure and capable of rearrangement thereon so as to permit reception of pallets from opposite sides thereof depending on the relation of the apparatus to the material route of the particular establishment in which the apparatus may be installed. The outer end of the curb rail 26 is provided with a curved spur portion 28 against which the pallet may brush in the event that the latter is caused to approach in slight misalignment with the platform so that proper alignment of the outer sill 21 with the side curb rail will be established whereupon the pallet may be moved rearwardly over the platform until the rear curb rail is engaged. This will properly align the pallet, and succeeding ones thereof, with the load-receiving platform and with the other components of the apparatus which will subsequently act upon the load borne thereby.

The dumper 12, arranged adjacent to and at one side of the load-receiving platform transversely relative to the longitudinal dimension of the base structure, comprises an elongated frame 29 having relatively spaced vertical side walls 31, the frame being pivotally mounted at one end of a shaft 32 journaled in bearings 33 which are supported on pedestal frames 34 attached to and rising from the opposite channel beams 7 of the base structure. A similar shaft 36 is provided at the opposite end of the dumper, being journaled in bearings 37 carried by the frame 29, and each of the shafts 32 and 36 are provided with suitable sprockets 38 meshing with continuous looped chains 39, or their equivalent equipped with interconnecting slats 41 or the like forming an endless flexible draper belt serving as a conveyor as will be explained presently. Suitable support rails 42 and idler rollers 43 are provided engaging the chains and belt respectively for preventing any sagging of the upper reach of the chains and for lessening the natural degree thereof in the lower reach of the chain as viewed in Figure 2A. An apron 44 is provided, arranged in planar normal relation to the draper belt, secured to the opposite side walls 31 of the dumper and extending from the outer edges of the latter to terminate in closely spaced relationship to the outer face of the belt. The primary operative position of the dumper is shown by the dotted lines of Figure 2A wherein the draper belt 41 is substantially vertical and is positioned in spaced relation with the confronting sides of the adjacent stacks of boxes carried by the pallet, the apron 44 being then horizontal and positioned slightly below the plane of the upper surface of the pallet. The dumper may move from its primary vertical position to a secondary position, shown by the full lines of Figure 2A wherein the distal end of the frame 29 comes to rest against a portion of a support structure carrying a takeaway chain conveyor 47 which is positioned below and directionally transverses the upper end of the draper belt. The chain 47 is carried by suitable support rails 48 and sprockets 49, the latter being secured to shafts 51 journaled in bearings 52 mounted on the support structure. One shaft 51 and its associated sprockets 49 is power driven so as to cause the takeaway chain conveyor 47 to move at a preselected rate of speed transversely of the direction of movement of the draper belt. Below the takeaway conveyor chain I provide a suitable receptacle, for the material contained in the boxes 24, which in this case I have chosen to show as a washing tank 53 containing water 54 or other suitable liquid or substance. Means are provided for driving the draper belt so that the upper reach thereof, as viewed in Figure 2A will move at constant speed toward the takeaway conveyor and its associated apparatus such as the tank 53. Positioned below the pivoted end of the dumper I provide a geared speed reducer 56 preferably direct-connected to a motor 57 or similar driver carried by a suitable base support 58 mounted on the beams 7. The power output shaft 59 of the speed reducer carries a sprocket 61 connected to a similar sprocket 62 on the pivot shaft 32 so that when the motor 57 is energized, the latter shaft will be rotated to drive the draper belt. In order to reduce the tensile stress in the draper belt parts during load conveying operations, I connect the shafts 32 and 36 to be driven synchronously by a chain 63, shown in Figure 1A, and meshing with suitable sprockets carried by and rotatable with the respective shafts. I also provide powered means for moving the dumper about its pivotal axis, represented by the shaft 32, from its vertical position, shown by the dotted lines of Figure 2A, to its reclining position indicated by the solid lines. This latter means comprises a cylinder 64 pivotally mounted, at its lower end, by a pivot pin 66 to clips 67 carried by the base structure and having a piston rod 68 slidably projecting from the upper end thereof which is pivotally connected by means of a stud 69 to a side portion of the dumper. A piston 71 carried by the piston rod 68 is adapted to be acted upon by liquid admitted to the cylinder through conduits 72 connected with the respective ends thereof and supplied from a motor-driven pump 70 through a solenoid-operated two way valve 65. It will be seen that by admitting fluid to the lower portion of the cylinder, the piston rod will be forcibly extended to raise the dumper to its perpendicular position while the admission of fluid to the opposite end of the cylinder and simultaneously exhausting the opposite end thereof will return the dumper to its reclined position. It will be noted that when the dumper is in the latter position, the upper or conveying surface of the draper belt assumes an angle, with respect to a horizontal plane, of approximately 10 degrees which has been found to be the most suitable inclination for proper frictional engagement of the belt with the boxes being conveyed and which is least conducive to tipping of the boxes during passage of the latter along the draper belt.

Referring now to Figure 2B, the pallet unloader comprises a pusher plate 73, positioned facing the stacked boxes opposite the open channel of the dumper, which is carried on supporting legs 74 secured to and rising from the base bars 76 equipped with suitably journaled wheels 77 which as is best shown in Figure 4 are adapted to roll along tracks formed by the upper flanges of the channel beams 7. The arrangement is such that the carriage will move freely along the tracks so as to cause the pusher plate to pass over the pallet and approach the dumper. Means for moving the pusher plate and its carriage is provided comprising an axially horizontal piston rod 78 operative with and movable relative to a cylinder 79 carried by a supporting frame 81 rising from the base structure. A source of liquid under pressure is provided in a pump 82 preferably direct connected, through a suitable coupling 83, to be driven by a motor 84. The pump and motor unit may be conveniently mounted on a tank 86 in which a quantity of liquid supplying the pump may be stored and a suction line 87 connects the pump and tank through which liquid may be withdrawn as required. A discharge or pressure line 88 leading from the pump is connected to a solenoid-actuated two-way valve 89 having conduits 91 leading to the respective ends of the cylinder 79 and provided with a fluid return line 92 connected with and to discharge into the storage tank 86. A by-pass line 93 having a spring loaded valve 94 therein is interposed between the discharge and return lines 88 and 92 respectively and operates under certain conditions as will be hereinafter explained. Means are provided for instituting and stopping the flow of liquid under pressure into the cylinder so that the pusher plate 73 may be made to stop at predetermined points in its movement across the pallet. Carried by and extending from the pusher plate, in parallel relation to the piston rod 78 thereof, is a control rod 96 carrying axially adjustable collars 97 provided with horizontally offset trip lugs 98 which, in the axial movement of the control rod corresponding to that of the piston rod, are capable of engaging the rollers 99 of rocker arms 101 connected with associated trip switches 102 mounted on a panel 103 suitably supported on the frame 81 so as to position the rollers 99 to be engaged by the lugs 98. The trip switches 102 function as limiting devices to stop the motor 84 so as to govern the degree of extension of the piston rod 78 and consequently the position of the pusher plate 73. It will be seen that the position of the first collar 97, as viewed in Figure 2B, relative to the nearest roller 99 of a trip switch 102 is equal to the width of a stack of boxes in the direction between the sides of the boxes paralleling the face of the pusher plate. Upon the energization of the motor 84 by the operation of a starting switch in a manner well known to those skilled in the art, the pump 82 will start delivering liquid from the tank 86 into the rear end of the cylinder 79. This will cause the pusher plate to forcibly engage the adjacent side of the grouped stacks of boxes and cause the entire group to be shifted across and relative to the pallet toward the dumper. The movement will continue until the first lug 98 engages the nearest roller 99 whereupon the operation of the switch 102 associated with the engaged roller will stop the motor and terminate the flow of liquid into the cylinder. This will have moved the group of stacks a distance equivalent to the aforesaid width of one stack and will therefore push the foremost row of stacks off the pallet and into the upright channel defined by the draper belt and the side walls 31 of the dumper. After the removal of the foremost stacks of boxes, as will be presently described, the pusher plate is similarly actuated to push the remaining stacks, in succession, from the pallet until the latter is completely unloaded. When this situation obtains, the valve 89 is conditioned to effect a reversal of flow through the conduits 91 and the pusher plate is fully retracted to its starting position as shown in Figure 2B. The empty pallet may be then removed and the load-receiving platform is ready for another loaded pallet which may be placed thereon in the manner previously described. If, for any reason, the controls should jam so that the pusher plate tends to continue movement beyond its extreme limit of travel, the excess pressure built up in the conduits 91 will open the valve 94 so as to permit by-passing of the liquid from the pump directly into the storage tank 86.

It will be seen in Figure 2A that upper surface of the apron 44 of the dumper is spaced slightly below the level of the upper surface of the pallet. Thus as the foremost stacks of boxes are pushed from the pallet a point will be reached where before the front face of the stacks reaches the draper belt of the upstanding dumper, the stacks will be overbalanced and will tilt slightly toward the dumper about a pivot point represented by the edge of the pallet. This tilting is of a limited nature and is stopped by the forward bottom edge of the lowermost boxes in the stacks engaging the surface of the apron. The result is that any slight overlap of one box in the foremost stack with an adjacent upper or lower box in the succeeding stack will be broken and any interference which may be caused by the boxes to free pivotal movement of the dumper is eliminated.

After the foremost stacks of boxes are fully positioned on the apron and relative to the dumper, the motor driven pump 70 is actuated to deliver liquid to the upper end of the cylinder 64, in an amount depending on the desired rapidity of action of the dumper, with the result that the latter is moved downwardly from its upstanding position to its reclining position. When the latter position is reached, the motor 57 is started to drive the draper belt which will then move the boxes carried by the belt upwardly and over the upper end thereof so as to dump the boxes in upside-down relation to and on the takeaway conveyor 47 which will then carry them away as fast as they are dumped. The contents of the boxes, since the takeaway conveyor is open, will fall therethrough into the tank 53 or other receiver. After the last box has been dumped, the dumper is returned by operation of the reversing valve 65, to its upstanding position to receive another row of stacks from the pallet. It will be noted that I provide a switch 104 on the load-receiving platform 11 which has a push rod operative by the apron 44 when the dumper is in upstanding position and which is connected, in a manner well known to those skilled in the art, with the motor 84 controlling movement of the pusher plate so that when the dumper is in any position other than the said upstanding position, the motor 84 may not be started so as to accidently push stacks of boxes from the pallet before the dumper is ready to receive them.

In addition to the controlled primary tilting action which is imparted to the foremost stacks of boxes of the group so as to relieve any slight overlap of the boxes as aforesaid, I provide means for laterally separating the stacks before the foremost thereof are received by the dumper so as to effect greater ease of handling by the draper belt and less crowding of the boxes on the takeaway conveyor. In Figure 1B it will be noted that the pusher plate 13, in plan view aspect, has a V-shaped cross-sectional form with the apex 106 substantially aligned with the interstice 107 between the lateral stacks of boxes. When the pusher plate first engages the boxes, the action is to push the inner junction of the stacks ahead of the outer corners so that opposite forces are imposed on the stacks resulting in their being forced apart to the positions indicated by the dotted lines of Figure 1B. It is in this separated condition that the stacks are finally deposited on the dumper apron 44 and are therefore moved in laterally spaced relation along the draper belt. Such spacing by preventing friction between adjacent boxes both on the draper belt and on the takeaway conveyor adds materially to the ease of conveyance and also considerably speeds up operations.

In Figure 5 I have shown a modified form of my invention designed for comparatively high speed operation. In this structure, the load-receiving platform and the pusher mechanism remain the same as in the previously described form of the invention but the dumper is modified somewhat. It will be seen that instead of a single wide belt capable of transporting the boxes of two stacks thereof, I provide separate belts 108 and 109 each sufficiently wide to transport the boxes of a single stack thereof and one belt 109 being somewhat longer than the other. The belts, of course, have a common drive and therefore move at the same peripheral speed. Instead of the single takeaway conveyor as used in the previously described form of the invention, I provide dual conveyors 111 and 112 which are positioned below the upper ends of the belts 109 and 108 respectively. It will be seen that in this arrangement, the respective takeaway conveyors are only required to move a distance equivalent to one box length before they are cleared to receive a succeeding box from the draper belt instead of requiring a slowdown until two boxes in file relation move aside to provide clearance for succeeding boxes to be dumped. Thus the dumping speed is materially increased and greater capacity may be realized from the apparatus.

I claim:

1. In combination, a load-receiving platform on which may be placed a pallet carrying rows of stacked receptacles, a dumper adjacent said load-receiving platform for receiving a stack of receptacles from a row thereof on the pallet, means operative in successive increments of movement of a part of such means for engaging and horizontally separating said rows of receptacles and for moving said separated rows of receptacles toward said dumper to transfer a stack of receptacles in each row from the pallet to the dumper, and means for operating said dumper to move the receptacles in said transferred stacks toward an inverted position.

2. In combination, a load-receiving platform on which may be placed a pallet carrying rows of stacked receptacles, a dumper adjacent said load-receiving platform for receiving a stack of receptacles from a row thereof on the pallet, means operative in successive increments of movement of a part of such means for engaging and horizontally separating said rows of receptacles and for moving said separated rows of receptacles toward said dumper to transfer a stack of receptacles in each row from the pallet to the dumper, means operative during movement of said rows of stacks for angularly vertically separating adjacent stacks prior to completion of transfer of stacks from the pallet to the dumper, means for operating said dumper to move said receptacles in the transferred stacks toward an inverted position, and means for removing successive receptacles from said dumper.

3. In combination, a load-receiving platform on which may be placed one of a succession of pallets carrying pluralities of rows of stacked receptacles, means on said platform for engaging adjacent sides of a pallet for locating successive pallets in predetermined position relative to said platform, a dumper adjacent said load-receiving platform movable from an upstanding loading position to a reclining dumping position, said dumper including an apron, which is substantially horizontal when the dumper is in loading position, and a draper belt which is in relatively horizontal position when the dumper is in dumping position, a pusher engageable with said rows of stacks and movable across said pallet for moving a stack of receptacles in each row thereof toward and onto said apron, said apron being positioned below the upper load-carrying surface of the pallet whereby, when stacks of receptacles are moved from the pallet onto the apron, the latter stacks will move to a controlled degree into vertical inclined relation with said surface of the pallet, said pusher including means for laterally separating adjacent sides of rows of said stacked receptacles, means for moving said dumper between loading and dumping positions whereby the receptacles in said stacks thereof on the apron will be moved toward inverted positions and will rest on said draper belt, and means for driving said draper belt to move the receptacles thereon toward a discharge position adjacent an end of said dumper.

4. In combination, a load-receiving platform on which may be placed one of a succession of pallets carrying pluralities of rows of stacked receptacles, means on said platform for engaging adjacent sides of a pallet for locating successive pallets in predetermined position relative to said platform, a dumper adjacent said load-receiving platform movable from an upstanding loading position to a reclining dumping position, said dumper including an apron, which is substantially horizontal when the dumper is in loading position, and a draper belt which is in relatively horizontal position when the dumper is in dumping position, a pusher engageable with said rows of stacks and movable across said pallet for moving a stack of receptacles in each row thereof toward and onto said apron, said pusher including means for laterally separating said rows of stacks during movement of the pusher across said pallet, said apron being positioned below the upper load-carrying surface of the pallet whereby, when stacks of receptacles are moved from the pallet onto the apron, the latter stacks will move to a controlled degree into vertical inclined relation with said surface of the pallet, means for moving said dumper between loading and dumping positions whereby the receptacles in said stacks thereof on the apron will be moved toward inverted positions and will rest on said draper belt, and means for driving said draper belt to move the receptacles thereon toward a discharrge position adjacent an end of said dumper.

5. In combination, a load-receiving platform on which may be placed one of a succession of pallets carrying pluralities of rows of stacked receptacles, means on said platform for engaging adjacent sides of a pallet for locating successive pallets in predetermined position relative to said platform, a dumper adjacent said load-receiving platform movable from an upstanding loading position to a reclining dumping position, said dumper including an apron, which is substantially horizontal when the dumper is in loading position, and a draper belt which is in relatively horizontal position when the dumper is in dumping position, a pusher engageable with said rows of stacks and movable across said pallet for moving a stack of receptacles in each row thereof toward and onto said apron, said pusher including an element for engaging a row of stacks adjacent the junction thereof with an adjoining row and for moving a side of the row in advance of the opposite side of the row so as to laterally separate said rows of stacks, said apron being positioned below the upper load-carrying surface of the pallet whereby, when stacks of receptacles are moved from the pallet onto the apron, the latter stacks will move to a controlled degree into vertical inclined relation with said surface of the pallet, means for moving said dumper between loading and dumping positions whereby the receptacles in said stacks thereof on the apron will be moved toward inverted positions and will rest on said draper belt, and means for driving said draper belt to move the receptacles thereon toward a discharge position adjacent an end of said dumper.

6. In combination, a load-receiving platform on which may be placed one of a succession of pallets carrying pluralities of rows of stacked receptacles, means on said platform for engaging adjacent sides of a pallet for locating successive pallets in predetermined position relative to said platform, a dumper adjacent said load-receiving platform movable from an upstanding loading position to a reclining dumping position, said dumper including an apron, which is substantially horizontal when the dumper is in loading position, and a draper belt which is in relatively horizontal position when the dumper is in dumping position, a pusher engageable with said rows of stacks and movable across said pallet for moving a stack of receptacles in each row thereof toward and onto said apron, said pusher including a plate of V-shaped horizontal cross-sectional forms with the apex of said V confronting and aligned to engage the junction between a pair of rows of stacks so that, during movement of the pusher across said pallet, the said rows of stacks will be laterally spread apart, said apron being positioned below the upper load-carrying surface of the pallet whereby, when stacks of receptacles are moved from the pallet onto the apron, the latter stacks will move to a controlled degree into vertical inclined relation with said surface of the pallet, means for moving said dumper between loading and dumping positions whereby the receptacles in said stacks thereof on the apron will be moved toward inverted positions and will rest on said draper belt, and means for driving said draper belt to move the receptacles thereon toward a discharge position adjacent an end of said dumper.

7. In combination, a load-receiving platform on which may be placed one of a succession of pallets carrying pluralities of rows of stacked receptacles, means on said platform for engaging adjacent sides of a pallet for locating successive pallets in predetermined position relative to said platform, a dumper adjacent said load-receiving platform movable from an upstanding loading position to a reclining dumping position, said dumper including an apron, which is substantially horizontal when the dumper is in loading position, and a draper belt which is in relatively horizontal position when the dumper is in dumping position, a pusher engageable with said rows of stacks and movable across said pallet for moving a stack of receptacles in each row thereof toward and onto said apron, said pusher being substantially V-shaped with the apex thereof aligned between lateral stacks of receptacles, means for moving said pusher in measured increments for moving successive stacks of receptacles from said pallet onto said apron, said apron being positioned below the upper load-carrying surface of the pallet whereby, when stacks of receptacles are moved from the pallet onto the apron, the latter stacks will move to a controlled degree into vertical inclined relation with said surface of the pallet, means for moving said dumper between loading and dumping positions whereby the receptacles in said stacks thereof on the apron will be moved toward inverted positions and will rest on said draper belt, and means for driving said draper belt to move the receptacles thereon toward a discharge position adjacent an end of said dumper.

8. In combination, a load-receiving platform on which may be placed one of a succession of pallets carrying pluralities of rows of stacked receptacles, means on said platform for engaging adjacent sides of a pallet for locating successive pallets in predetermined position relative to said platform, a dumper adjacent said load-receiving platform movable from an upstanding loading position to a reclining dumping position, said dumper including an apron, which is substantially horizontal when the dumper is in loading position and a plurality of draper belts which are in relatively horizontal position when the dumper is in dumping position, one of said draper belt being longer than another thereof and each draper belt being provided with a separate conveyor traversing an end thereof, a pusher engageable with said rows of stacks and movable across said pallet for moving a stack of receptacles in each row thereof toward and onto said apron, said pusher including means for engaging a row of stacks adjacent the junction thereof with an adjoining row of stacks and for moving a side of the row so as to laterally separate said rows of stacks, means operative with said pusher for laterally separating said rows of stacks during movement of the pusher across said pallet, said apron being positioned below the upper load-carrying surface of the pallet whereby, when stacks of receptacles are moved from the pallet onto the apron, the latter stacks will move to a controlled degree into vertical inclined relation with said surface of the pallet, means for moving said dumper between loading and dumping positions whereby the receptacles in said stacks thereof on the apron will be moved toward inverted positions and will rest on said draper belts, and means for driving said draper belts to move the receptacles thereon toward an end of the belts to discharge onto the respective conveyors.

ROLLIE B. NAWMAN.

REFERENCES CITED

The following references are of record in the file of this patent:

UNITED STATES PATENTS

| Number | Name | Date |
| --- | --- | --- |
| 1,879,393 | Miller | Sept. 27, 1932 |
| 1,907,458 | Stevenson | May 9, 1933 |
| 2,127,007 | Paxton | Aug. 16, 1938 |
| 2,172,685 | Thompson | Sept. 12, 1939 |
| 2,256,454 | Bomar | Sept. 16, 1941 |
| 2,338,048 | Minaker | Dec. 28, 1943 |
| 2,397,129 | Davis | Mar. 26, 1946 |
| 2,410,515 | McMichael | Nov. 5, 1946 |